No. 716,481. Patented Dec. 23, 1902.
T. ROTTLER.
BEAT ADJUSTER FOR PENDULUM CLOCKS.
(Application filed Aug. 8, 1902.)
(No Model.)
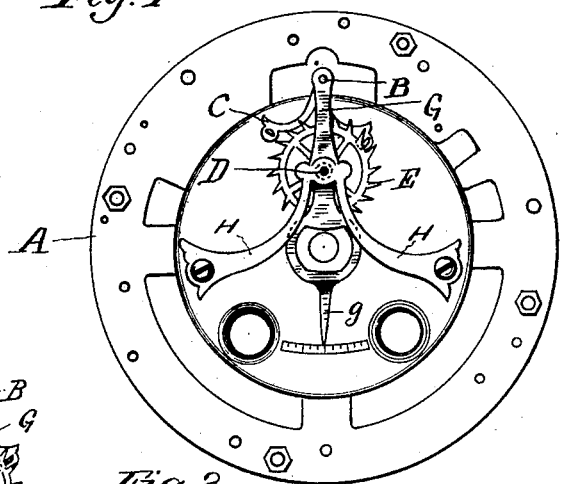
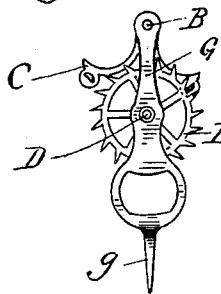
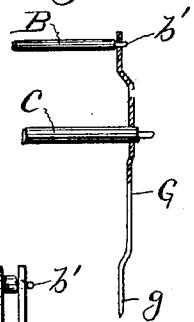
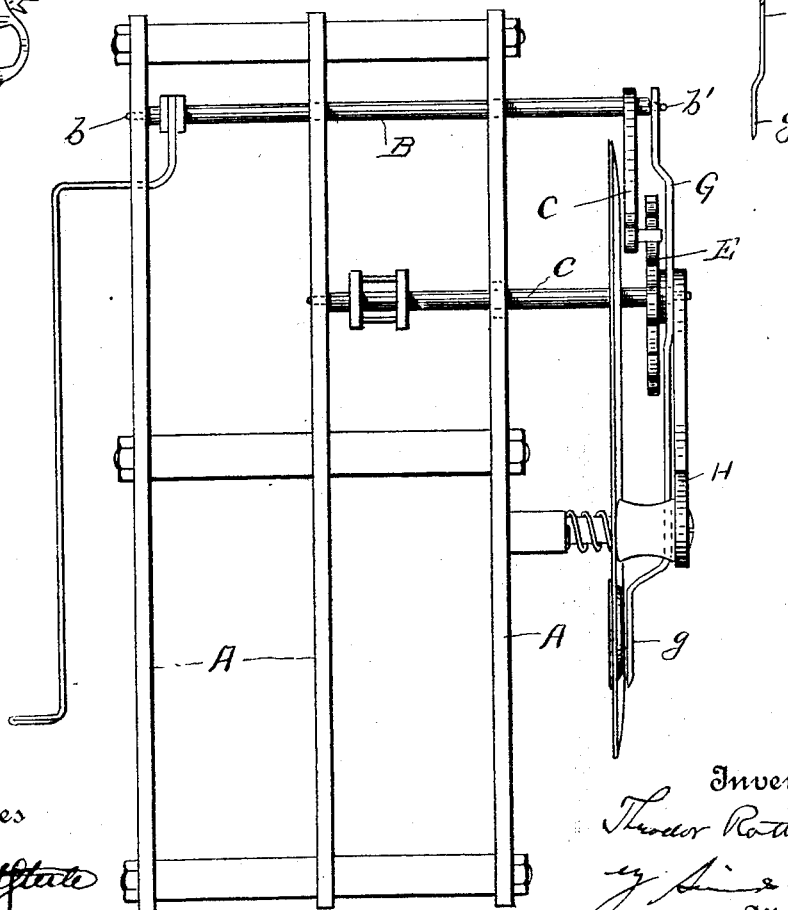
Witnesses
Inventor
Theodor Rottler
Attorneys

UNITED STATES PATENT OFFICE.

THEODOR ROTTLER, OF WINSTED, CONNECTICUT, ASSIGNOR TO WM. L. GILBERT CLOCK COMPANY, OF WINSTED, CONNECTICUT, A CORPORATION OF CONNECTICUT.

BEAT-ADJUSTER FOR PENDULUM CLOCKS.

SPECIFICATION forming part of Letters Patent No. 716,481, dated December 23, 1902.

Application filed August 8, 1902. Serial No. 118,887. (No model.)

*To all whom it may concern:*

Be it known that I, THEODOR ROTTLER, a citizen of the United States of America, residing at Winsted, in the county of Litchfield and State of Connecticut, have invented certain new and useful Improvements in Clocks, of which the following is a specification.

My invention has to do particularly with an improved means for regulating the beat of a clock mechanism for maintaining the parts in operative relation to one another.

Referring to the drawings, Figure 1 is a front view of a clock-frame having my invention applied thereto. Fig. 2 is a side view of the same on enlarged scale. Figs. 3 and 4 are detail views.

Referring to the drawings, A denotes the clock-frame in which the works are mounted, after which it is placed in the clock-case and secured therein in any desired manner.

B is the pallet-staff.

C is the pallet.

D is the escape-wheel staff, and E is the escape-wheel.

One end of the pallet-staff is pivoted in the frame in the usual manner, as at $b$; and the other end is pivoted in the bridge-plate G, as at $b'$. This bridge-plate G is mounted on the escape-wheel staff C. The end of the escape-wheel staff is supported by the arms H H. The bridge-plate G is extended below the pallet-wheel staff and terminates in a pointer $g$, coöperating with a graduated scale on the dial. This pointer $g$ also serves as a handle.

It is readily seen that the distance between the pallet-staff and the escape-wheel staff, and consequently the relation between the pallet and the escape-wheel, is maintained without regard to any strain or warping which may occur and which very often does occur in assembling the clock-movement in its case. It has been customary heretofore to support the end of the pallet-staff separately from the support for the escape-wheel shaft, and it results from this construction that the movement is liable to be strained or warped slightly and the adjustment of the pallet with respect to the escape-wheel entirely destroyed. It is evident that this is impossible in the construction herein shown and described.

Another advantage accruing from this construction resides in the convenient means provided for regulating the beat of the clock. As is well known, if the support on which the clock is placed is not exactly level the coöperation of the pallet with the escape-wheel is hindered or interrupted, and the clock consequently will not run accurately or else stops altogether. In order to remedy the difficulty, it has been necessary heretofore either to level the clock up or else to readjust the relative positions of the pallet and escape-wheel, and in order to do this it is necessary to get at the back of the clock. This of course necessitates a change in the position of the clock, and it cannot be regulated with any degree of accuracy. By the use of the construction herein shown and described the relative positions of the pallet and escape-wheel can be adjusted from the front of the clock without disturbing its position. The manner of accomplishing this result is apparent, inasmuch as if the pointer or handle $g$ is moved in either direction the opposite end of the bridge-plate G, which carries the end of the pallet-staff B, is moved in the arc whose center is the center of the escape-wheel.

The advantages arising from the adoption of this construction are manifold, and I am aware that the embodiment of the invention herein shown and described is susceptible of modification without departing from the scope of the invention.

I claim as my invention—

1. In a clock in combination the frame, the escape-wheel staff supported in fixed bearings at each end, and the pallet-staff supported at one end in the frame and at the opposite end in a plate which is connected with and rotary about the escape-wheel staff, substantially as described.

2. In a device of the class specified in combination the frame, the escape-wheel staff supported at each end in fixed bearings, a bridge-plate rotarily mounted on said staff, the pallet-staff supported at one end in the frame and at its opposite end in said bridge-plate, substantially as described.

3. In a device of the class specified in combination the frame, the escape-wheel staff mounted at each end in fixed bearings, the pallet-staff mounted at one end in a fixed bearing and at the opposite end in a movable bearing, and rigid connections between said movable bearing and the escape-wheel staff, substantially as described and for the purposes set forth.

4. In a device of the class specified in combination the frame, the escape-wheel staff supported at the rear in the frame and at the front in fixed bearings, a bridge-plate rotarily mounted on the front end of the escape-wheel staff, and the pallet-staff supported at the rear in the frame and at the front in said bridge-plate, substantially as described.

5. In a device of the class specified in combination the frame, the escape-wheel staff mounted in fixed bearings, the escape-wheel on said staff, the pallet-staff mounted at the rear in fixed bearings and at the front in a movable bearing, the pallet on said staff co-operating with the escape-wheel, and means located at the front ends of said escape-wheel and pallet-staffs for adjusting the relative positions of the pallet and the escape-wheel, substantially as described and for the purposes set forth.

In testimony whereof I affix my signature in presence of two witnesses.

THEODOR ROTTLER.

Witnesses:
CARABEL KINNEY,
SAMUEL A. WETMORE.